United States Patent Office 3,245,515
Patented Apr. 12, 1966

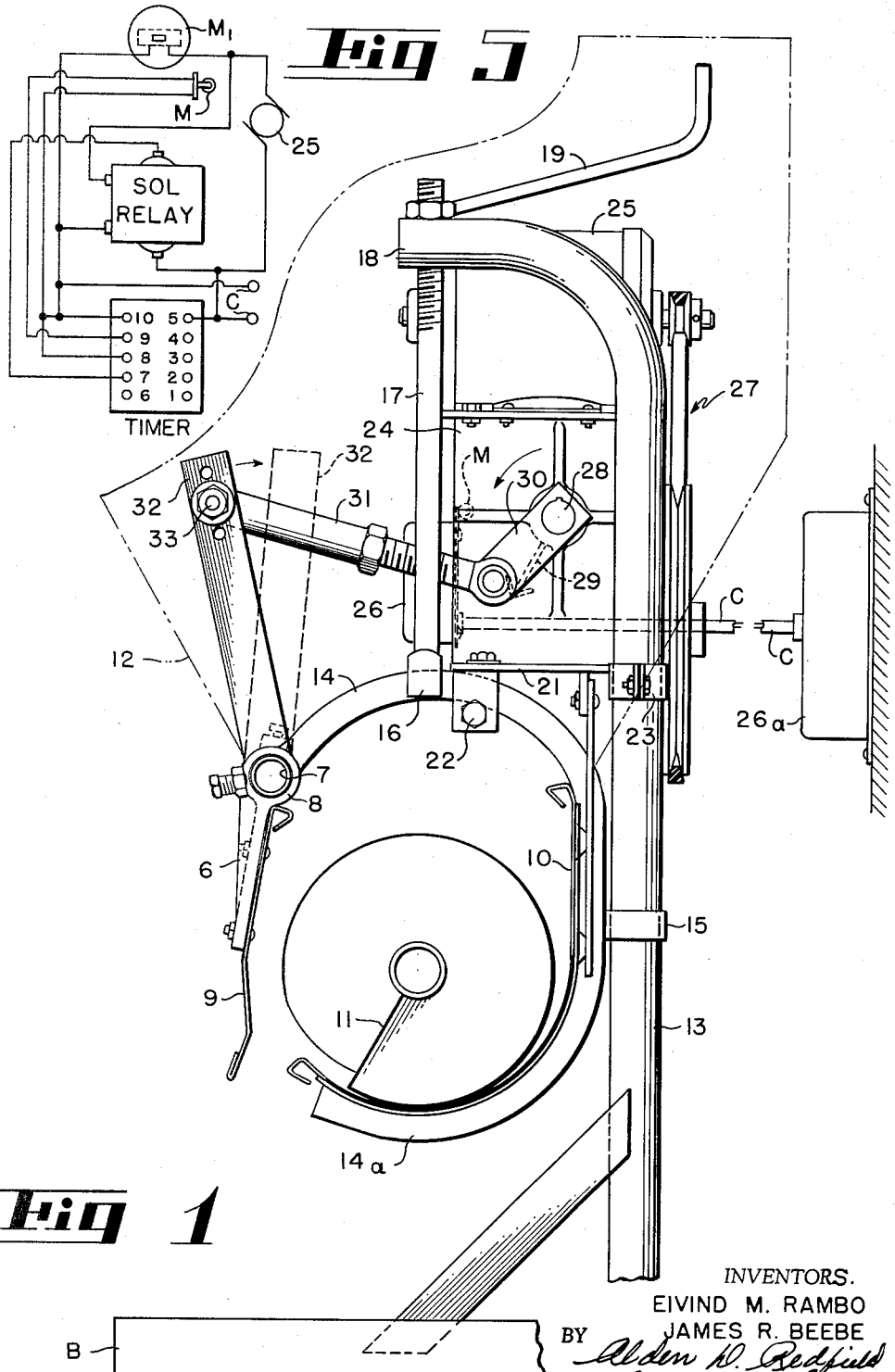

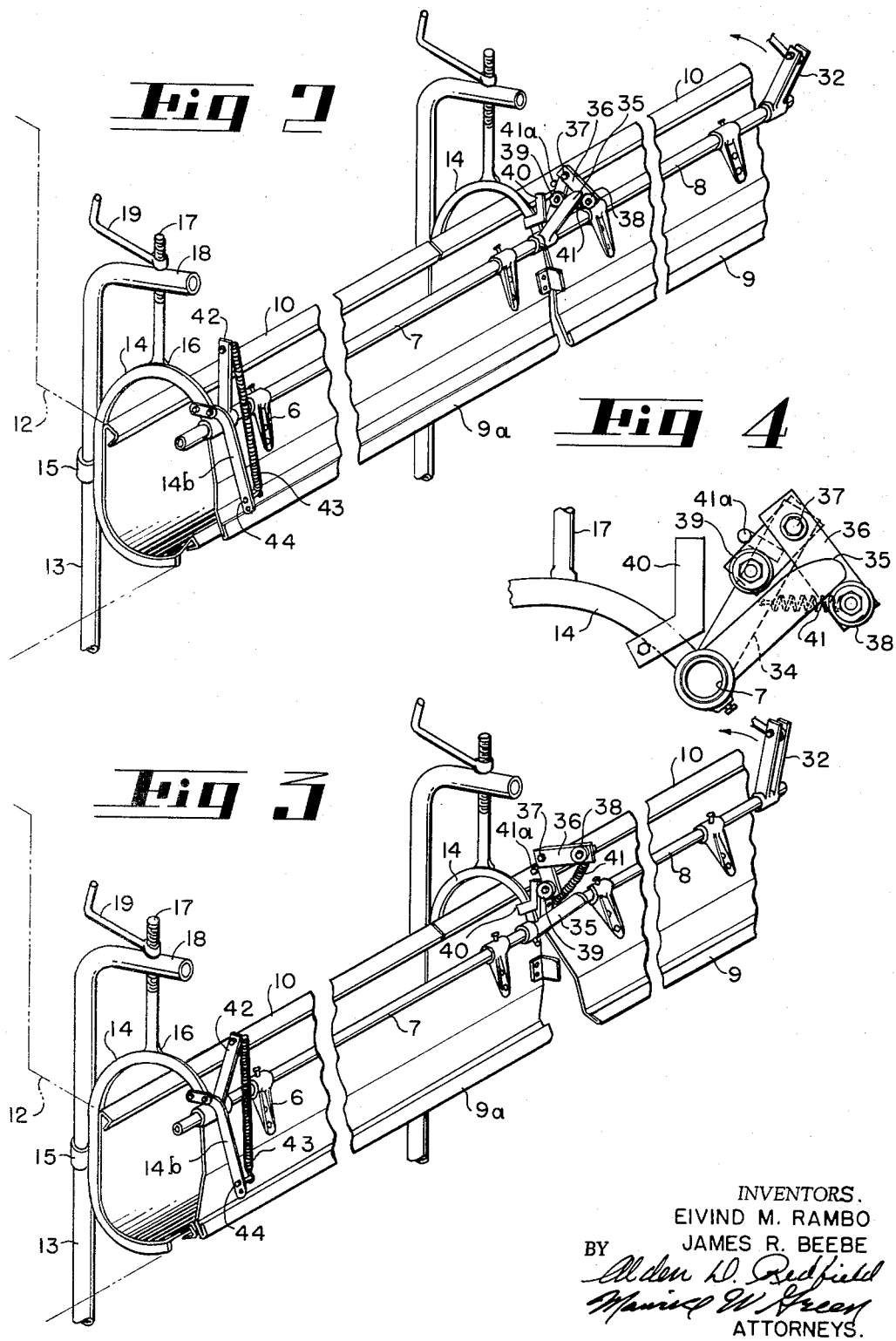

3,245,515
AUTOMATIC BUNK FEEDER MECHANISM
Eivind M. Rambo, Ogdensburg, and James R. Beebe, New London, Wis., assignors to Avco Corporation, New London, Wis., a corporation of Delaware
Filed Apr. 16, 1964, Ser. No. 360,329
8 Claims. (Cl. 198—64)

This invention relates to devices for moving cattle feed from a source thereof and depositing it into a longitudinally extending feeding bunk from which cattle can feed. Such devices are commonly known as bunk feeders.

In feeding animals from bunks it is common to provide a trough communicating with a hopper or other source of feed and to provide an auger within the trough for moving the feed lengthwise of the trough. Such troughs are sometimes provided with gates which can be opened appropriately to discharge feed from the trough as it is moved therealong by the auger, into an elongated feed bunk extended along the length of the trough.

This type of apparatus requires considerable manual attention in order to make sure that appropriate amounts of feed are being supplied to the system and are discharged uniformly into the bunk. Attention must also be given to the problem of insuring that an excess of feed is not discharged into the part of the bunk immediately adjacent the hopper. When this occurs the cattle tend to crowd around the first part of the bunk and the strongest cattle are able to appropriate the most feed. This situation is deplored by cattlemen who desire to give the weaker cattle an opportunity to obtain sufficient nourishment so that they will likewise prosper.

Objects of the invention include the provision of a gate mechanism by which the amount of feed is evenly distributed throughout the elongated feed bunk, is automatically controlled, both from the point of view of time and quantity, and the deposit of excessive amounts of feed in the first part of the bunk is positively prevented.

Another object is to provide means for early closing the first of a plurality of gates, i.e., at a time prior to that at which the remaining gates are closed.

Other objects of the invention will more clearly appear when reference is had to the following specification and claims in the light of the accompanying drawings, in which:

FIG. 1 is a transverse view of one section of a bunk feeder constructed in accordance with the invention showing means by which a longitudinally disposed gate control shaft is automatically rotated to open and close a series of gates secured thereto at predetermined points along its length;

FIG. 2 is a fragmentary perspective view of such a bunk feeder, showing the two gate sections which are closest to the hopper from which feed is distributed, and showing the gates in open position;

FIG. 3 is a view similar to FIG. 2, showing the first gate, that is, the gate closest to the hopper, in closed position after having been moved to such position by the early closing means comprised within the present invention;

FIG. 4 is a view showing the actuating mechanism in FIGS. 2 and 3 in greater detail; and FIG. 5 is a wiring diagram showing one method of connecting the electrical components in a control circuit.

In accordance with the invention, a bunk feeder of the general type shown in the patent to Carew and Walker, No. 3,105,586, dated October 1, 1963, is provided. Such feeder includes a longitudinal trough 10 within which is disposed an auger 11 which is rotated by suitable means (not shown) which are well known in the art. One end of the trough (the distal end as viewed in FIG. 1) may communicate with a hopper 12, shown in phantom lines, into which feed is deposited for movement by the auger along the length of the trough. The trough is supported at suitable intervals along its length by supports including standards 13, which are generally the same, and only one of which will be described.

Standards 13 are secured to the base B and support the trough through mounting brackets 14, which are secured around the trough at 14a and to an intermediate point of standards 13 by a bracket 15. The brackets 14 are additionally supported by threaded rods 17 secured to the brackets 14 at 16 and extending upwardly through the upper inturned ends 18 of standards 13. Threaded at the upper end of each rod 17 is a crank 19 which can be turned to raise and lower the rod and adjust the position of the trough.

In the outermost ends of brackets 14 are mounted aligned control shafts for controlling the opening and closing of the gates. In prior art constructions there is only one shaft that is controlled, usually by hand, but according to the present invention we provide two control shafts 8 and 7, which are independently operable. Control shaft 8 is actuated by lever 32 from the full line position to intermediate positions as shown by the dashed lines in FIG. 1, by means hereinafter to be described. Rotation of shaft 8 from the full line position to the dashed line position opens the gate 9. Aligned shaft 7, actuated by means hereinafter to be described, is rotated from position shown in FIG. 2 to that shown in FIG. 3, whereby gate 9a, the gate closest to the hopper 12, is independently closed during the early part of the cycle of operation. For clarity, auger 11 is omitted from FIGS. 2 and 3.

In order to effect an automatic opening and closing of the gates, we provide means supported on a platform 21 secured to bracket 14 at 22 and to standard 13 at 23. This means comprises a gear box 24, motor 25, control box 26 containing a microswitch actuating member M which actuates a microswitch connected on the control circuit, and belt and pulley system connecting the motor to the gear box, shown generally by reference character 27. The output of the gear box comprises shaft 28 to which is secured a cam 29 and a crank arm 30, the latter connected through adjustable link 31 to the end of lever 32, previously indentified. A suitable gear reduction is accomplished through the belt and pulley system and the gear box so that rotation of shaft 28 is of the order of 5 r.p.m.

Within a separate control box 26a, mounted at a remote position convenient to the operator, is a timer connected to close the electrical circuit at appropriate intervals to start the motor 25 A time-delay relay type timer may be used for this purpose. The timing intervals may be conveniently chosen to insure that the feed will reach the extreme end of the bunk before the motor 25 is started to initiate the opening of the gates. The motor operates the system to turn the crank 30 in the direction of the arrows, moving the lever 32 to the dashed line position shown in FIG. 1 to open gate 9. The shaft 28 continues to turn until it completes a rotation of 360 degrees, at which time the high point of cam 29 contacts a microswitch actuating member M extending outwardly from control box 26. This switch is connected to open the control circuit at this point, whereby the motor 25 is stopped and the timer reset to zero. The timer, motor and microswitch are interconnected as shown in FIG. 5, according to principles well known in the art, through electrical connections to a source of electric power through supply cable C and may include a manual switch $M_1$.

It will be appreciated that with the circuit disclosed the motor 25 will be energized and deenergized at times pre-set on the timer and the cycle will repeat itself as the auger continues to convey feed through the trough until the operator decides that enough feed has been delivered into the bunk. The feeder auger will usually be stopped with the gates partially open. A manual switch may be provided on separate control box 26a to override the timer so that the gates may be opened independently of the timer.

The cycling mechanism described may be placed at any stand along the feeder, except the first and second stand adjacent to the hopper end, although it is preferable to have this placed midway of the entire length of the bunk to minimize the tendency of the control shafts 7 and 8 to twist or "wrap up" at distances greater than 75 feet.

The early closing mechanism of the present invention is illustrated in FIGS. 2, 3 and 4 and is located at the trough contiguous to the source of feed, in the illustrative embodiment, the hopper 12. It comprises a mechanism, parts of which are conveniently located at each end of the gate which is desired to close early.

At the end of the control shaft 8, which in the illustrated embodiment only extends the length of a single gate but may of course extend the length of several gates, is a crank arm 34 adjustably secured thereto. At the upper end of arm 34 is a bell crank lever 36 pivoted to the arm at 37 and having at its outermost end a roller 38, arranged to strike the end of an arm 35 adjustably secured to control shaft 7. On the lower arm of bell crank 36 is another roller 39 which causes bell crank 36 to rotate on its pivot 37 when it strikes fixed arm 40, thereby releasing arm 35.

The other end of control shaft 7 is rotatably secured in the end of bracket 14 and is provided with an arm 42 adjustably secured thereto. To the end of arm 42 is secured a spring 43, the other end of which is secured at 44 to the end of an extension 14b fixedly secured to bracket 14. It will be apparent that the tension of the spring will tend to rotate the shaft 7 in a direction clockwise as viewed in FIG. 2, thereby tending to close the gate 9a, which is likewise adjustably secured to the shaft by supporting brackets 6.

In operation it will be seen that as arm 32 is moved clockwise as shown in FIG. 1 (or counterclockwise as shown in FIGS. 2 and 3), the shaft 8 will be appropriately turned to open the gate 9 and any other gates secured to shaft 8. This turning movement will be imparted to arm 34, tending to move the arm in a counterclockwise direction and pull lever 35 (attached to shaft 7) in a similar direction by the force exerted by roller 38 on the bottom side of arm 35. As the arm 34 continues to move, roller 39 strikes arm 40 and causes roller 38 to roll off the end of arm 35, bell crank 36 pivots about its axis 37 and changes its position from that shown in FIG. 2 to that shown in FIG. 3. When roller 38 releases arm 35 the latter will tend to move downwardly by the force of spring 43 on arm 42 at the other end of shaft 7, thus closing gate 9a. Arm 34 will of course be adjusted so that when it is in the position shown in FIG. 3 with roller 39 against stop 40, gate 9 will be open and crank 36 will have swung upwardly to release 35 so that gate 9a will be closed. Spring 41 and stop 41a may be provided to insure that the roller 38 will strike the top of arm 35 and re-engage therewith during that part of the cycle when the arm 32 is rotated to its outermost position and the shaft 8 is rotated to close gate 9.

It will be appreciated that with the foregoing construction we have not only provided a mechanism which will automatically program the opening and closing of a series of gates to permit feed to flow therefrom at predetermined times, but also an early closing mechanism which will insure that the first gate, or gates, will be automatically and independently opened and closed during the time the other gates are open. This assures that an excess of feed is not discharged into that part of the bunk which is immediately adjacent the hopper 12.

While we have illustrated an electrically controlled automatic cycling system, it will be appreciated that the early closing mechanism of the invention may be used with equal efficacy with a bunk feeder in which the cycling is controlled by other means. The shaft 7 does not of course know what cycling means has been utilized to control shaft 8, from which it is actuated.

Having thus described our invention, we claim:

1. In a bunk feeder comprising a feed trough, a hopper communicating with one end thereof, an auger in said trough for moving feed from said hopper through said trough, a plurality of gates spaced longitudinally along said trough, means for opening said gates, and means responsive to said first means for opening and closing a gate closest to said hopper during the time the remaining gates are open.

2. In a bunk feeder comprising a feed trough, a hopper communicating with one end thereof, an auger in said trough for moving feed from said hopper through said trough, a plurality of gates spaced longitudinally along said trough, means for opening said gates, and means responsive to said first means for independently opening and closing a gate closest to the hopper.

3. In a bunk feeder comprising a feed trough, a hopper communicating with one end thereof, an auger in said trough for moving feed from said hopper through said trough, a plurality of gates spaced longitudinally along said trough, means for opening the gates at predetermined intervals of time and means responsive to said first means for closing a gate adjacent the hopper during the time the remaining gates are open.

4. In a bunk feeder comprising a feed trough, a hopper communicating with one end thereof, an auger in said trough for moving feed from said hopper through said trough, a plurality of gates spaced longitudinally along said trough, means for cyclically opening said gates and means responsive to said cycling means closing a gate nearest the hopper during the early part of the cycle.

5. In a bunk feeder comprising a feed trough, a hopper communicating with one end thereof, an auger in said trough for moving feed from said hopper through said trough, a plurality of gates spaced longitudinally along said trough, means for cyclically opening said gates and means responsive to said cycling means for independently actuating a gate adjacent the hopper.

6. In a bunk feeder comprising a feed trough, a hopper communicating with one end thereof, an auger in said trough for moving feed from said hopper through said trough, a plurality of gates spaced longitudinally along said trough, means for opening and closing said gates at predetermined times to permit the full length of the feeder to discharge feed simultaneously when said gates are open, and means for automatically maintaining the first gate closed while the remaining gates are open.

7. In a bunk feeder comprising a feed trough, a hopper communicating with one end thereof, an auger in said trough for moving feed from said hopper through said trough, a plurality of gates spaced longitudinally along said trough, means for opening and closing said gates at predetermined times to permit the full length of the feeder to discharge feed simultaneously when said gates are open, and means for automatically closing the first gate independently of the other gates.

8. A bunk feeder comprising a trough, means for supplying feed to one end thereof, gate means spaced longitudinally along said trough, cycling means for opening and closing said gates at predetermined time intervals, and means responsive to said cycling means for closing the gate adjacent said supply means during the time the remaining gates are open.

References Cited by the Examiner
UNITED STATES PATENTS

| | | | |
|---|---|---|---|
| 3,077,975 | 2/1963 | Hobbs | 198—205 |
| 3,105,586 | 10/1963 | Carew | 119—52 |
| 3,116,715 | 1/1964 | Krumheuer | 196—64 |

EVON C. BLUNK, *Primary Examiner.*

RICHARD E. AEGERTER, *Examiner.*